United States Patent
Deutsch et al.

(10) Patent No.: US 12,450,198 B2
(45) Date of Patent: Oct. 21, 2025

(54) SYSTEMS AND METHODS FOR GENERATION OF METADATA BY AN ARTIFICIAL INTELLIGENCE MODEL BASED ON CONTEXT

(71) Applicant: OpenAI Opco, LLC, San Francisco, CA (US)

(72) Inventors: Noah Deutsch, San Francisco, CA (US); Benjamin Zweig, San Francisco, CA (US); Valerie Zerfas, San Francisco, CA (US); Madeline Simens, San Francisco, CA (US); Michael Heaton, San Francisco, CA (US); Nicholas Turley, San Francisco, CA (US)

(73) Assignee: OpenAI OpCo LLC, San Francisco, CA (US)

( * ) Notice: Subject to any disclaimer, the term of this patent is extended or adjusted under 35 U.S.C. 154(b) by 0 days.

(21) Appl. No.: 18/497,616

(22) Filed: Oct. 30, 2023

(65) Prior Publication Data

US 2025/0139057 A1    May 1, 2025

(51) Int. Cl.
  *G06F 16/16* (2019.01)
  *G06F 3/048* (2013.01)
  *G06F 40/284* (2020.01)
  *G06F 40/40* (2020.01)

(52) U.S. Cl.
  CPC ............ *G06F 16/164* (2019.01); *G06F 3/048* (2013.01); *G06F 40/284* (2020.01); *G06F 40/40* (2020.01)

(58) Field of Classification Search
  CPC ...... G06F 16/164; G06F 40/284; G06F 40/40; G06F 3/048
  See application file for complete search history.

(56) References Cited

U.S. PATENT DOCUMENTS

| 8,990,224 B1 * | 3/2015 | Ouellette ............... G06Q 10/10 |
| | | 707/754 |
| 9,639,632 B2 * | 5/2017 | Kim ...................... G06F 16/113 |
| 2009/0052804 A1 * | 2/2009 | Lewis ..................... G06F 16/93 |
| | | 382/298 |

(Continued)

OTHER PUBLICATIONS

Wolf et al. "Transformers: State-of-the-Art Natural Language Processing", 2020, pp. 40-43. (Year: 2020).*

(Continued)

*Primary Examiner* — Matthew J Ellis
(74) *Attorney, Agent, or Firm* — FINNEGAN, HENDERSON, FARABOW, GARRETT & DUNNER LLP

(57) ABSTRACT

Disclosed herein are methods and systems for generating metadata from content using one or more machine learning models. In an embodiment, a method may include receiving the content through a graphical user interface associated with the large language model, generating a first file by tokenizing the content into an input format for the large language model and merging the tokenized content with a content instruction, inputting the first file into the large language model, generating, using the large language model, metadata from at least the first file, the metadata reflecting a context associated with the content, generating a second file, the second file comprising the metadata, and displaying the generated metadata on the graphical user interface.

20 Claims, 5 Drawing Sheets

(56) References Cited

U.S. PATENT DOCUMENTS

| | | | | |
|---|---|---|---|---|
| 2010/0332234 | A1* | 12/2010 | Agapi | G10L 15/22 |
| | | | | 704/E15.04 |
| 2017/0357661 | A1* | 12/2017 | Hornkvist | G06F 16/148 |
| 2019/0311002 | A1* | 10/2019 | Paulus | G06N 3/006 |
| 2019/0362020 | A1* | 11/2019 | Paulus | G06F 18/24143 |
| 2023/0060252 | A1 | 3/2023 | Bly et al. | |
| 2023/0223016 | A1* | 7/2023 | Konam | G06F 40/284 |
| | | | | 704/231 |
| 2024/0121125 | A1* | 4/2024 | Blair | G06F 40/263 |
| 2025/0013830 | A1* | 1/2025 | Clarke | G06F 40/279 |

OTHER PUBLICATIONS

Cui et al. "A Practical Approach to Re-sizing Character Variable Lengths for FDA Submission Datasets (both SDTM and ADaM)", 2016. (Year: 2016).*

* cited by examiner

☐ What is a patent?

☐ A patent is a legal right granted by a government to an inventor or assignee, providing exclusive ownership and control over an invention for a limited period. In essence, it gives the patent holder the right to prevent others from making, using, selling, or importing the patented invention without permission during the patent's duration.

The main purpose of a patent is to incentivize innovation by offering inventors protection and recognition for their creations. In exchange for disclosing their invention to the public, inventors are granted the exclusive rights to exploit their invention commercially for a specific period, typically 20 years from the filing date of the patent application (this duration can vary depending on the type of patent and the country).

There are three main types of patents:

1. Utility Patents: These are the most common type and cover new and useful processes, machines, compositions of matter, or any new and useful improvement thereof.
2. Design Patents: These protect the ornamental design or appearance of a functional item. They do not cover the functional aspects but only the aesthetic elements.
3. Plant Patents: These are granted for new and distinct varieties of plants that have been asexually reproduced.

To obtain a patent, the inveNtion must be novel, non-obvious, and useful. The process of obtaining a patent involves filing a patent application with the relevant patent office, which includes a detailed description of the invention, claims defining the scope of protection sought, and any necessary drawings or diagrams.

Patents are territorial, which means they are only valid within the country or region where they are granted. This means an inventor may need to file separate patent applications in different countries to secure worldwide protection for their invention. Additionally, patents are subject to public disclosure, which allows others to learn from the invention after the patent expires and contribute to further innovation.

○ Patent: Legal Rights for …

Send a message

FIG. 3

SYSTEMS AND METHODS FOR GENERATION OF METADATA BY AN ARTIFICIAL INTELLIGENCE MODEL BASED ON CONTEXT

FIELD OF DISCLOSURE

The disclosed embodiments generally relate to systems, devices, methods, and computer readable media for automatically generating and displaying metadata from content using a machine learning model-based approach.

BACKGROUND

Auto-naming systems can be prompted or instructed to generate a name for content. For example, auto-naming system may be prompted to generate a title for a document or a subject line to an e-mail. Many conventional auto-naming systems, however, lack contextual understanding and generate names based on predefined patterns without considering content nuances. Therefore, they have limitations when it comes to accurately understanding complex content to generate creative names or adapt to diverse contexts. Moreover, many auto-naming systems may rely on templates or formulaic approaches, leading to repetitive and uninspiring names.

The disclosed embodiments address one or more of these shortcomings, as well as other problems in previous systems and methods.

SUMMARY

Embodiments of the present disclosure present technological improvements as solutions to one or more of the above-mentioned technical problems recognized by the inventors in conventional systems. For example, in an embodiment, a non-transitory computer-readable medium may include instructions that are executable by one or more processors to perform operations for generating metadata from content using one or more machine learning models, such as a large language model. The operations may include receiving the content through a graphical user interface associated with the large language model, and generating a first file by tokenizing the content into an input format for the large language model and merging the tokenized content with a content instruction. The operations may also include inputting the first file into the large language model, and generating, using the large language model, metadata from at least the first file, the metadata reflecting a context associated with the content. The operations may also include generating a second file, the second file comprising the metadata, and displaying the generated metadata on the graphical user interface.

According to some disclosed embodiments, the content comprises a text query from a user.

According to some disclosed embodiments, the content comprises at least one of a text document or an image file.

According to some disclosed embodiments, generating the second file comprises resizing the second file to comport with a predetermined size, the predetermined size being pre-established for a specific use selected from at least one of thumbnail, title, or abstract.

According to some disclosed embodiments, the operations may also include generating structured content associated with the received content.

According to some disclosed embodiments, the operations may also include incorporating the structured content into the content for the input into the large language model.

According to some disclosed embodiments, the large language model comprises a multi-modal large language model.

According to some disclosed embodiments, generating the metadata comprises prompting the large language model to generate the metadata based on the first file.

According to some disclosed embodiments, generating the metadata comprises finetuning the large language model based on the first file to generate the metadata.

According to some disclosed embodiments, the content comprises a plurality of words, and the large language model is trained to generate contextual embeddings for each word of the plurality of words.

According to some disclosed embodiments, the large language model is configured to perform abstractive text summarization.

According to some disclosed embodiments, the operations may also include modifying the generated metadata in the second file by filtering the metadata and modifying a size of the metadata.

According to some disclosed embodiments, displaying the generated metadata comprises displaying the modified metadata on the graphical user interface.

According to some disclosed embodiments, the modified metadata comprises at least one of a title, subtitle, name, icon, thumbnail, category, summary, description, or image associated with the content.

Other systems, methods, and computer-readable media are also discussed within.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 3 illustrates an exemplary graphical user interface in accordance with some embodiments of the present disclosure.

DETAILED DESCRIPTION

Figure 1:
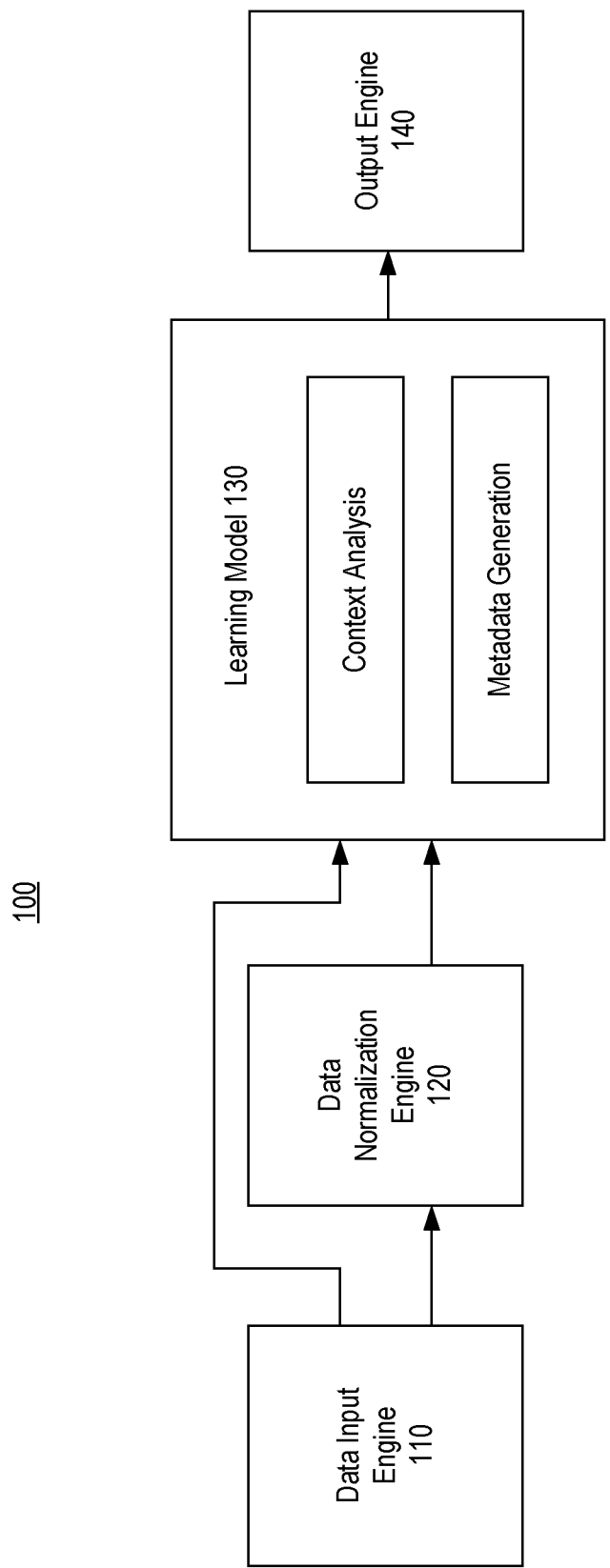
FIG. 1 is a block diagram illustrating an exemplary system for automatically generating metadata from content, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed (e.g., executed) simultaneously, at the same point in time, or concurrently. Reference will now be made in detail to the disclosed embodiments, examples of which are illustrated in the accompanying drawings.

It is to be understood that both the foregoing general description and the following detailed description are exemplary and explanatory only and are not restrictive of this disclosure. The accompanying drawings, which are incorporated in and constitute a part of this specification, illustrate several exemplary embodiments and together with the description, serve to outline principles of the exemplary embodiments.

This disclosure may be described in the general context of customized hardware capable of executing customized preloaded instructions such as, e.g., computer-executable instructions for performing program modules. Program modules may include one or more of routines, programs, objects, variables, commands, scripts, functions, applications, components, data structures, and so forth, which may perform particular tasks or implement particular abstract data types. The disclosed embodiments may also be practiced in distributed computing environments where tasks are performed by remote processing devices that are linked through a communications network. In a distributed computing environment, program modules may be located in local and/or remote computer storage media including memory storage devices.

The embodiments discussed herein involve or relate to artificial intelligence (AI). AI may involve perceiving, synthesizing, inferring, predicting and/or generating information using computerized tools and techniques (e.g., machine learning). For example, AI systems may use a combination of hardware and software as a foundation for rapidly performing complex operation to perceive, synthesize, infer, predict, and/or generate information. AI systems may use one or more models, which may have a particular configuration (e.g., model parameters and relationships between those parameters, as discussed below). While a model may have an initial configuration, this configuration can change over time as the model learns from input data (e.g., training input data), which allows the model improve its abilities. For example, a dataset may be input to a model, which may produce an output based on the dataset and the configuration of the model itself. Then, based on additional information (e.g., an additional input dataset, validation data, reference data, feedback data), the model may deduce and automatically electronically implement a change to its configuration that will lead to an improved output.

Powerful combinations of model parameters and sufficiently large datasets, together with high-processing-capability hardware, can produce sophisticated models. These models enable AI systems to interpret incredible amounts of information according to the model being used, which would otherwise be impractical, if not impossible, for the human mind to accomplish. The results, including the results of the embodiments discussed herein, are astounding across a variety of applications. For example, an AI system can be configured to autonomously navigate vehicles, automatically recognize objects, instantly generate natural language, understand human speech, and generate artistic images.

Machine learning models of various capabilities, described herein, may be utilized to generate metadata from content. For instance, one or more machine learning models, such as large language models, image generation models, or multimodal models, may be used to understand a context of content, such as textual content, visual content, or audio content, amongst others. For instance, the one or more machine learning models may be used to process extracted features from the content and map relationships between the features to understand how the features relate to one another and contribute to the overall context. Based on the understanding of the content, the one or more machine learning models may generate metadata for the content, such as keywords, tags, summaries, captions, icons, thumbnails, and any other type of descriptive information to help in providing a context of the content. It is appreciated that the human mind is not equipped to perform this operation, given its computationally complex nature, which goes beyond simple evaluations or observations of content. Illustrative embodiments of the present disclosure are described below.

Some embodiments of this disclosure are directed to utilizing one or more machine learning models such as a large language model, image generation model, or multimodal model, to improve upon conventional systems for generating metadata. For example, disclosed embodiments may be employed for auto-generation of metadata, names, or titles, by being able to accurately understand context, identify complex sentiments, and create abstractive summaries that capture key information, contexts and nuances. In addition, disclosed systems and methods may utilize one or more machine learning models trained using a vast amount of data, which may result in metadata that is unique and more accurate.

The operations of the disclosed embodiments may improve the technical field of metadata generation by utilizing machine learning models such as large language models, image generation models, or multimodal models trained using extensive and diverse datasets that allow computers to generate contextually accurate metadata. Enabling efficient and automatic generation of metadata of different modalities and scales, such as using textual content to generate image metadata, or vice versa, the disclosed embodiments are highly adaptable to various use cases, and can lead to increased efficiency and cost savings. Further, automatic generation of metadata may improve record generation and tracking, facilitate automated object creation and/or storage. It is appreciated that the human mind is not equipped to perform such operations given the computationally complex nature of the disclosed embodiments.

FIG. 1 is a block diagram illustrating an exemplary system for automatically generating metadata from content using one or more machine learning models, according to some embodiments of the present disclosure.

System 100 may include data input engine 110. As discussed below with respect to FIG. 5, an engine may be a module (e.g., a program module), which may be a packaged functional hardware unit designed for use with other components (e.g., at least one processor and a memory component) or a part of a program that performs a particular function (e.g., of related functions). In some embodiments, data input engine 110 may be configured to obtain and/or receive content directly from external users. In some embodiments, data input engine 110 may be configured to obtain and/or receive user input data via one or more user interfaces.

In some embodiments, data input engine 110 may be configured to obtain and/or receive content comprising at least one of textual content, visual content, audio content, structured data, interactive content, or code, amongst others. In some embodiments, textual content may be in the form of plain text, rich text, Hypertext Markup Language (HTML), markdown, XML, one or more documents (e.g., portable document format (PDF), Word document), one or more sentences, one or more phrases, one or more paragraphs, or any combination of characters. In some embodiments, visual content may be in the form of one or more images, one or more icons, one or more photographs, one or more videos, any combination of pixels, or any sequence of images or frames. In some embodiments, audio content may be in the form of one or more sound signals or one or more digital recordings of sound, such as music, podcasts, or spoken words. In some embodiments, structured data may comprise one or more tables, one or more databases or one or more spreadsheets. In some embodiments, interactive content may comprise one or more web applications or interactive visualizations. In some embodiments, code may comprise computer code or programming code such as text-based instructions for computers to execute. In some embodiments, content may comprise an input text prompt. Additionally or alternatively, content may comprise of a null set (e.g., having no content, no user input or no natural language input). In some embodiments, data input engine 110 may be configured to obtain and/or receive user instructions comprising text data in the form of at least one of a sentence, a paragraph, or a user prompt. A user instruction may include at least one of an instruction, a defined task, or any combination of parameters that set one or more constraints on language model output. In some embodiments, data input engine 110 may be configured to determine one or more content types (e.g., textual, visual, audio, structured data, computer code, etc.) associated with the content.

In some embodiments, data input engine 110 may be configured to generate one or more first files. For example, generating the one or more first files may comprise tokenizing the content into an input format for the one or more machine learning models and merging the tokenized content with a content instruction.

System 100 may further include data normalization engine 120. In some embodiments, data normalization engine 120 may be configured to determine the one or more content types associated with the content. Based on the determined content type, data normalization engine 120 may be configured to perform a normalization process specific to the content type. In some embodiments, data normalization engine 120 may perform a combination of normalization processes for content associated with multiple content types (i.e., different modalities). In some embodiments, the steps performed by data normalization engine 120 may be omitted.

In some embodiments, data normalization engine 120 may be configured to prepare and standardize textual content prior to inputting the textual content into learning model 130. In some embodiments, data normalization engine 120 may be configured to perform tokenization to break down the content into smaller units (i.e., tokens).

In some embodiments, data normalization engine 120 may be configured to convert all characters in the content to lowercase. In some embodiments, data normalization engine 120 may be configured to remove punctuation from the content. In some embodiments, data normalization engine 120 may be configured to remove or normalize special characters from the content. In some embodiments, data normalization engine 120 may be configured to convert numbers in the content into a standardized format (e.g., converting dates to a consistent format, converting numbers to words). In some embodiments, data normalization engine 120 may be configured to remove stop words (e.g., and, the, is, etc.) from the content. In some embodiments, data normalization engine 120 may be configured to check for and correct spelling errors in the content. In some embodiments, data normalization engine 120 may be configured to expand abbreviations and acronyms in the content.

In some embodiments, data normalization engine 120 may be configured to perform lemmatization, stemming, and part-of-speech tagging of the content. In some embodiments, data normalization engine 120 may be configured to extract plain text from the content. In some embodiments, data normalization engine 120 may be configured to render the content into another format (e.g., markdown to HTML). In some embodiments, data normalization engine 120 may perform normalization based on a length of the content or a desired length of output based on a user instruction. In some embodiments, data normalization engine 120 may perform normalization based on a set of model parameters. In some embodiments, a language model application framework may correspond to at least one of generation, open Question-Answer (Q), closed QA, brainstorming, chat, rewriting, summarization, classification, extraction, or other.

In some embodiments, data normalization engine 120 may be configured to prepare and standardize visual content prior to inputting the visual content into learning model 130. In some embodiments, data normalization engine 120 may be configured to perform feature extraction. For example, data normalization engine 120 may be configured to extract features by transforming raw visual data (e.g., pixels) into a set of meaningful features by using machine learning (e.g., neural networks, such as convolutional neural networks (CNNs), recurrent neural networks (RNNs)). In some embodiments, features extracted for images may include edges, textures and/or shapes. In some embodiments, features extracted for videos may include temporal data. In some embodiments, data normalization engine 120 may be configured to perform normalization to ensure that the content has a consistent scale and distribution, such as by mean subtraction and normalization by standard deviation. In some embodiments, data normalization engine 120 may be configured to perform at least one of resizing, cropping, or compressing content to a consistent format and/or resolution. In some embodiments, data normalization 104 may be configured to perform data augmentation. For example, data augmentation may comprise random transformations (e.g., rotations, flips, cropping, brightness adjustments) to increase a diversity of visual content. In some embodiments, data normalization engine 120 may be configured to encode extracted features into a format. For example, data normalization engine 120 may be configured to encode extracted features into numerical representations for input into learning model 130.

In some embodiments, data normalization engine 120 may be configured to synchronize visual content with other content. For example, in the case of videos, data normalization engine 120 may be configured to align visual content with one or more timestamps of audio or textual data. Doing so may ensure that features from different modalities correspond to the same content. In some embodiments, data normalization engine 120 may be configured to combine information from different modalities. For example, data normalization engine 120 may fuse the aligned features from different modalities through concatenation, element-wise addition, or any other fusion techniques. Doing so may enable learning model 130 to make predictions based on a holistic understanding of a multi-modal context.

In some embodiments, data normalization engine 120 may be configured to perform further pre-processing based on one or more user inputs received from data input engine 110. For example, depending on one or more use inputs, data normalization engine 120 may be configured to perform further pre-processing such as cropping a region-of-interest for object detection or face detection and alignment for facial expression analysis. In some embodiments, data normalization engine 120 may be configured to identify missing information in the content and perform steps to handle the missing information. For example, data normalization engine 120 may be configured to perform imputation, zero-filling, interpolation, data fusion, feature engineering, amongst others. In some embodiments, data normalization engine 120 may exclude missing information from further processing.

In some embodiments, data normalization engine 120 may be configured to normalize audio content prior to inputting the visual content into learning model 130, wherein normalizing audio content may comprise similar steps as discussed above for visual content. In some embodiments, data normalization engine 120 may be configured to perform noise reduction and/or enhancement to improve a signal-to-noise ratio.

In some embodiments, data normalization engine 120 may be configured to normalize structured data by standardizing column names, data types, and/or formatting for consistency. In some embodiments, data normalization engine 120 may be configured to convert content to a standardized format.

In some embodiments, data normalization engine 120 may be configured to generate one or more files comprising the normalized content for inputting into learning model 130. For example, data normalization engine 120 may be configured to generate one or more plain text files (e.g., .txt, .csv, .log, .html, .xml, etc.) comprising the normalized textual content. In some embodiments, data normalization engine 120 may be configured to generate one or more image files (e.g., .jpg, .png, etc.) comprising normalized visual data. In some embodiments, data normalization engine 120 may be configured to generate one or more audio files (e.g., .wav, .mp3, etc.) comprising normalized audio data. In some embodiments, data normalization engine 120 may be configured to generate one or more files capable of storing multi-modal data (e.g., JSON, HDF5, etc.).

System 100 may further include learning model 130. In some embodiments, learning model 130 may comprise at least one of a language model (e.g., large language model (LLM), multi-modal language model), an image generation model, or a multi-modal model. In some embodiments, learning model 130 may be configured to perform one or more steps performed by data normalization engine 120. In some embodiments, learning model 130 may be configured to analyze at least the first file. In some embodiments, learning model 130 may be configured to generate a response based on the analysis. For example, content may comprise a query from a user (e.g., "What is a patent?") received through a graphical user interface, and learning model 130 may be configured to generate a response to the query from the user (e.g., "A patent is . . . ") by analyzing the query.

In some embodiments, analyzing the first file may comprise performing context analysis. In some embodiments, learning model 130 may comprise an autoregressive model, wherein tokens may be generated one at a time with each new token being predicted by considering a context of all previously generated tokens as well as the query. For example, learning model 130 may be configured to tokenize the query from the user into individual words or sub-words. Using the tokenized query, learning model 130 may be configured to generate a probability distribution for a first token to append to generated text. Once the first token is appended to the generated text, resulting in updated text, learning model 130 may be configured to predict a second token based on an updated context of the updated text. Learning model 130 may be configured to repeat this process until a desired response length or stopping condition is reached. In some embodiments, the desired response length or stopping condition may be preset. For example, the desired response length or stopping condition may be determined by at least one of a user-specified length or a maximum token limit. In some embodiments, learning model 130 may dynamically determine the desired response length or stopping condition based on the context of the content.

In some embodiments, learning model 130 may be configured to analyze at least the first file based on a received content instruction. For example, data input engine 110 or data normalization engine 120 may append content instruction to the first file prior to inputting the first file into learning model 130. In some embodiments, learning model 130 may be configured to analyze the first file automatically, without receiving the content instruction. For example, learning model 130 may be configured to analyze the first file in response to a trigger event, wherein the trigger event may be receiving the first file. In some embodiments, the trigger event may be generating the response to the query from the user. Additionally or alternatively, the trigger event may be associated with a timer, wherein learning model 130 may be configured to analyze the first file on a periodic basis (e.g., every few seconds, minutes, hourly etc.). In some embodiments, learning model 130 may be configured to analyze the first file to generate metadata.

In some embodiments, learning model 130 may be configured to analyze learning model data in response to receiving a content instruction. Learning model data may include at least the first file and the response to the query generated by learning model 130. For example, the content instruction may comprise a request to analyze the learning model data. In some embodiments, learning model 130 may be configured to analyze learning model data automatically, without receiving the content instruction. For example, learning model 130 may be configured to analyze the learning model data in response to a trigger event, wherein the trigger event may be receiving the first file. In some embodiments, the trigger event may be generating the response to the query from the user. Additionally or alternatively, the trigger event may be associated with a timer, wherein learning model 130 may be configured to analyze the learning model data on a periodic basis (e.g., every few seconds, minutes, hourly etc.). In some embodiments, learning model 130 may be configured to analyze the learning model data to generate metadata.

In some embodiments, learning model 130 may be configured to analyze at least one of the first file or the learning model data to identify and output a set of context parameters associated with the first file or the learning model data. For instance, the set of context parameters may comprise at least one of a location ("where"), a person ("who"), a time period or time of day ("when"), an event ("what"), or causal reasoning ("why") associated with the first file or the learning model data. In some embodiments, learning model 130 may be configured to analyze at least one of the first file or the learning model data to identify a set of key elements within the first file or the learning model data. For example, learning model 130 may be configured to identify keywords and phrases within textual data by recognizing patterns and recurring terms. Additionally or alternatively, learning model 130 may be configured to identify key visual elements within visual data by analyzing visual features (e.g., size, color, shape, position) within the visual data. For example, learning model 130 may be configured to analyze the learning model data to identify objects within the first file or the learning model data.

In some embodiments, learning model 130 may be configured to understand a context of an image or video frame to determine whether one or more objects within the image or video frame should be considered key visual elements. In some embodiments, when the first file or the learning model data comprises multiple modalities, learning model 130 may be configured to analyze each modality separately to extract modality-specific features. For example, for textual data, learning model 130 may be configured to perform natural language processing techniques. For example, learning model 130 may be configured to perform named entity recognition (NER). Additionally or alternatively, for visual data, learning model 130 may be configured to perform computer vision techniques. Additionally or alternatively, for audio data, learning model 130 may be configured to perform audio processing techniques. In some embodiments, learning model 130 may be configured to combine the extracted modality-specific features using fusion techniques. Doing so may allow learning model 130 to capture cross-modal relationships and understand how the different modalities contribute to learning model data.

In some embodiments, learning model 130 may be configured to discard elements not identified as key elements. Doing so may allow learning model 130 to focus on key elements and data aligning with the key elements and contextual understanding. In some embodiments, learning model 130 may be configured to learn from patterns in training data, which may allow for identification of or more common themes, topics, or information important for generating metadata.

In some embodiments, learning model 130 may be configured to generate metadata based on analyzing at least one of the first file or the learning model data. For example, learning model 130 may analyze the first file or the learning model data to generate one or more titles, subtitles, names, icons, thumbnails, categories, descriptions, keywords, tags, summaries, captions, images, or any other descriptive information associated with the first file or the learning model data. For example, learning model 130 may be configured to generate metadata associated with the first file or the learning model data based on determining at least one of a main topic, purpose, or one or more key points of the first file or the learning model data. In some embodiments, learning model 130 may be configured to modify the generated metadata by filtering the metadata and modifying a size of the metadata. For example, learning model 130 may be configured to filter the metadata to remove any offensive, sensitive, or inappropriate information. Additionally or alternatively, learning model 130 may be configured to modify a size of the metadata based on one or more constraints, such as user interface constraints or design constraints.

System 100 may further include output engine 140. Output engine 140 may be configured to receive the second file comprising the generated metadata from learning model 130 and output the generated metadata to at least one of a graphical user interface, another engine, another system, or a device (e.g., a user device). For example, output engine 140 may be configured to output the generated metadata to the one or more graphical user interfaces used by data input engine 110 to obtain and/or receive user input data. In some embodiments, output engine 140 may further reduce a length of the generated metadata to be less than or equal to a fixed number of characters, words, or sentences, or combination thereof. In some embodiments, the fixed number may be influenced by a user input.

Figure 2:
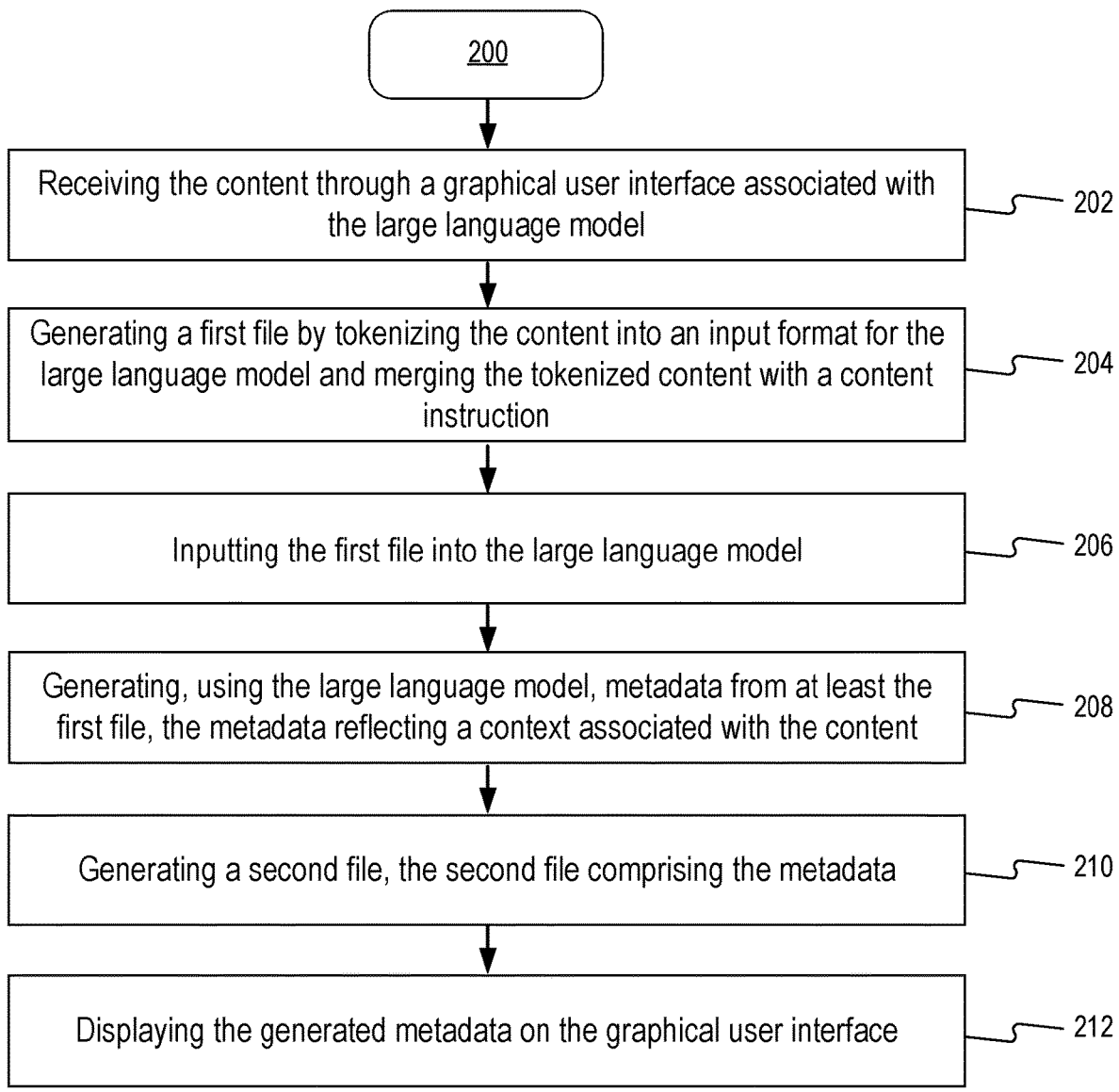
FIG. 2 is a flow diagram illustrating an exemplary process for automatically generating and displaying metadata from content using one or more machine learning models, according to some embodiments of the present disclosure.

FIG. 2 is a flow diagram illustrating an exemplary process for generating metadata from content using one or more machine learning models, according to some embodiments of the present disclosure.

Figure 4:
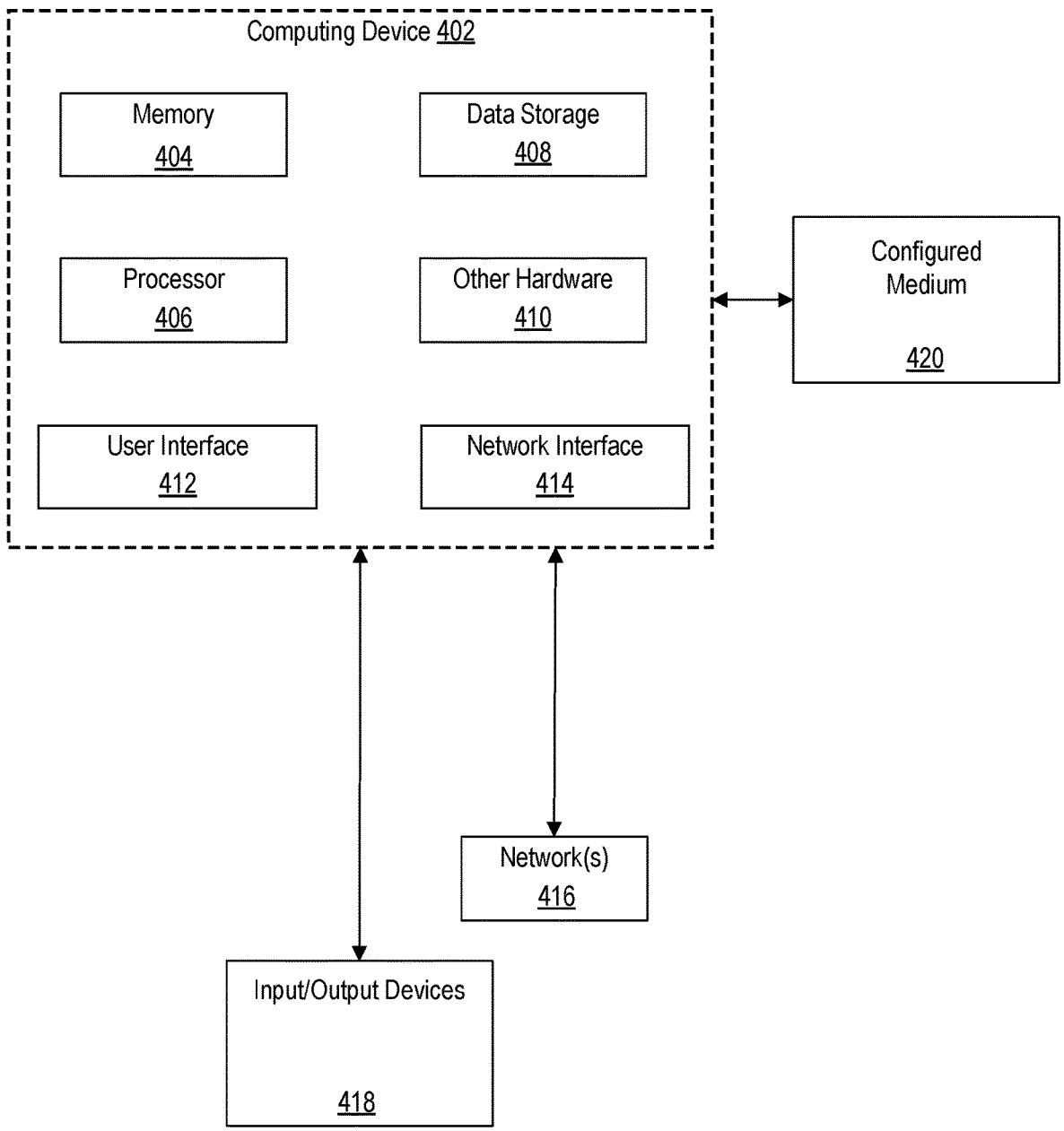
FIG. 4 is a block diagram illustrating an exemplary operating environment for implementing various aspects of this disclosure, according to some embodiments of the present disclosure.
Figure 5:
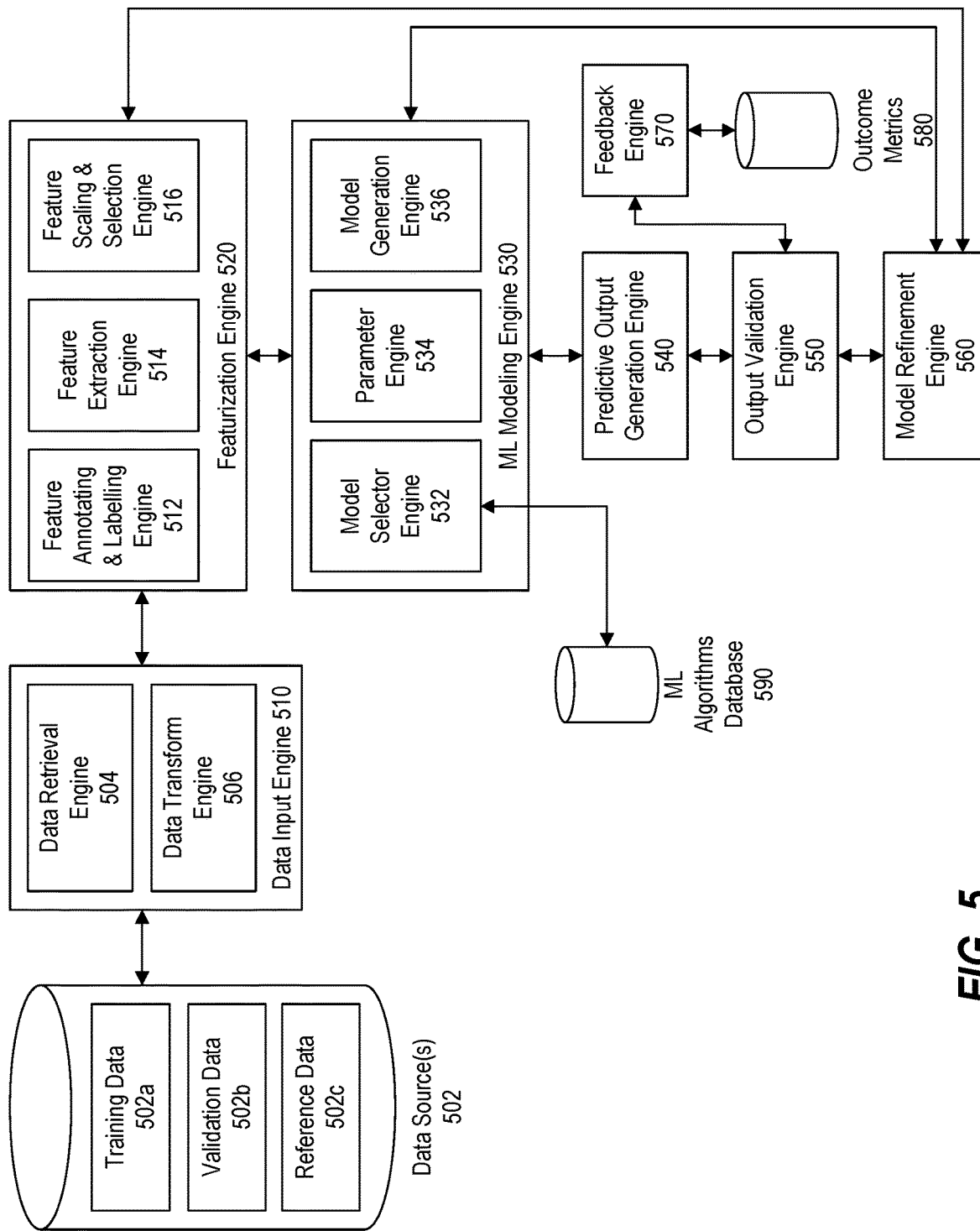
FIG. 5 is a block diagram illustrating an exemplary machine learning platform for implementing various aspects of this disclosure, according to some embodiments of the present disclosure.

Process 200 may be performed (e.g., executed) by a system, such as system 100 of FIG. 1, or system 500 of FIG. 5. In some embodiments, process 200 may be implemented using at least one processor (e.g., processor 406 of FIG. 4), which may execute one or more instructions that can be stored on a computer-readable medium (e.g., storage device 408 of FIG. 4). While the steps in FIG. 2 are shown in a particular exemplary order, the individual steps may be reordered, omitted, and/or repeated.

In some embodiments, process 200 may begin at step 202. At step 202, the at least one processor may be configured to receive content associated with the one or more machine learning models. In some embodiments, the one or more machine learning models may comprise at least one of an unsupervised model, supervised model, transformer-based model, autoregressive model, large language model, a multimodal large language model, an image generation model, Naïve Bayes, Support Vector Machines (SVM), neural network, or a multimodal model. Content may include textual content, visual content, audio content, structured data, interactive content, code, or any other data capable of being input into a machine learning model (as discussed above with respect to data input engine 110).

In some embodiments, the content may comprise a text query from a user (e.g., 304 of FIG. 3 discussed below). In some embodiments, the content may comprise at least one of a text document, an image file or an audio file. In some embodiments, content may include at least one of user-labeled data, unlabeled data, or publicly available data (which may or may not be labeled). In some embodiments, the at least one processor may be configured to receive content via a user interface (e.g., 300 of FIG. 3 discussed below) configured to support interaction between the one or more machine learning models and one or more users. In some embodiments, the user interface may include one or more of a command line interface, a graphical user interface (GUI), natural user interface (NUI), voice command interface, and/or other user interface (UI) presentations. In some embodiments, step 202 may include receiving an input text prompt (e.g., via text input element 304 of FIG. 3 discussed below), which may include an amount of text, which may have been input at a user device (e.g., to a user interface linked to a machine learning model through an API). For example, input data may include one or more of a user-written or machine-written prompt, a user-written or machine-written instruction, web-crawled text, or any other text data (e.g., one or more words, phrases, sentences or paragraphs).

Additionally or alternatively, step 202 may include receiving one or more user instructions, such as where input data includes at least one of user instructions or prompts. In some embodiments, content may include one or more user-generated and/or machine-generated metadata and/or labels that may provide enhanced digital structure to the content. Doing so may reduce processing strain during training and may generate more accurate results further in the process. In some embodiments, receiving content may include accessing data from a storage device (e.g., remote or local storage device) or requesting data (e.g., from a remote or local device). In some embodiments, receiving content may include receiving a first input prompt (e.g., query discussed above with respect to FIG. 1) from a user device. In some embodiments, one or more prompts may be generated directly by external users. A prompt may include at least one of user instructions or a user-defined task.

In some embodiments, the at least one processor may be configured to normalize the content. In some embodiments, normalizing the content may comprise preparing and standardizing the content for input into one or more machine learning models. For example, normalizing the content may include tokenizing the content into an input format for the one or more machine learning models. In some embodiments, prior to normalizing the content, the at least one processor may be configured to determine one or more content types (e.g., textual, visual, audio, structured data, computer code, etc.) associated with the content. Based on the determined one or more content types, the at least one processor may be configured to perform a normalization process specific to the content type. In some embodiments, normalizing the content may comprise performing a combination of normalization processes for content associated with multiple content types (i.e., different modalities, such as text, images, audio, etc.). In some embodiments, content normalization may be performed by at least one of data normalization engine 120 or learning model 130 from FIG. 1.

In some embodiments, the at least one processor may be configured to generate structured content associated with the received content, and normalizing the content may include incorporating the structured content into the content for the input into the one or more machine learning models. For example, the at least one processor may be configured to define a structure and format for structured data, such as determining at least a number of columns, headings, an arrangement of rows, or other formatting requirements.

In some embodiments, the at least one processor may be further configured to assemble the received content in a tabular form. Once the content is assembled, the at least one processor may be configured to format the received content according to the defined structure. For instance, formatting the received content may comprise ensuring that the content is correctly aligned with rows and columns of the defined structure, resulting in structured content. In some embodiments, the at least one processor may be configured to label each element of the structured content. In some embodiments, the at least one processor may be configured to handle missing data, such as by marking empty cells in the structured content as "N/A" or providing placeholders. In some embodiments, the at least one processor may be configured to validate the structured data for accuracy and consistency. In some embodiments, the at least one processor may be configured to include metadata in the structured content to provide additional context or information about the structured content. In some embodiments, the at least one processor may be configured to define one or more data types for each column or field of the structured content.

At step 204, the at least one processor may be configured to generate one or more first files. For example, generating the one or more first files may comprise tokenizing the content into an input format for the one or more machine learning models and merging the tokenized content with a content instruction. In some embodiments, the generated one or more first files may include at least one of plain text files (e.g., .txt, .csv, .log, .html, .xml, etc.), image files (e.g., .jpg, .png, etc.), audio files (e.g., .wav, .mp3, etc.) or a combination thereof. In some embodiments, the at least one processor may be configured to generate one or more files capable of storing multimodal data (e.g., JSON, HDF5, etc.) for input into one or more multimodal models.

In some embodiments, the at least one processor may be configured to merge the tokenized content with a content instruction by generating, using the one or more machine learning models, metadata associated with at least the first file. For example, the generated content instruction (e.g., content instruction discussed above with respect to FIG. 1) may comprise a request to analyze at least the first file. In some embodiments, the content instruction may comprise a request from a user to analyze at least the first file. In some embodiments, the content instruction may comprise one or more user instructions received by data input engine 110. In some embodiments, the content instruction may comprise a request from a user to generate metadata for learning model data, wherein learning model data may include at least the first file and the generated response to the query from the user. In some embodiments, the content instruction may be generated by the at least one processor based on the content. For example, based on the content comprising only text, the at least one processor may generate the content instruction for input to a language model with the first file. Based on the content comprising only images, the at least one processor may generate the content instruction for input into an image generation model with the first file. In some embodiments, the at least one processor may be configured to append the content instruction to the tokenized content. In some embodiments, the at least one processor may be configured to append the content instruction to the content prior to inputting the content into the large language model.

In some embodiments, the at least one processor may be configured to analyze the first file or the learning model data automatically, without receiving the content instruction. For example, analyzing the first file or the learning model data may be initiated by a trigger event, wherein the trigger event may be inputting the first file into learning model 130. In some embodiments, the trigger event may be generating the response to the query from the user. Additionally or alternatively, the trigger event may be associated with a timer, wherein learning model 130 may be configured to analyze the first file on a periodic basis (e.g., every few seconds, minutes, hourly, etc.). In some embodiments, the at least one processor may be configured to omit merging the content instruction, and may only input at least one of the content or the tokenized content into the one or more machine learning models.

At step 206, the at least one processor may be configured to input the first file into the one or more machine learning models.

In some embodiments, the at least one processor may be configured to identify, using the one or more machine learning models, a context associated with at least the first file. In some embodiments, the content may comprise a plurality of words, and the one or more machine learning models may be trained to generate contextual embeddings for each word of the plurality of words. In some embodiments, the one or more machine learning models may be trained to perform sentiment analysis. In some embodiments, sentiment analysis may comprise determining a sentiment expressed in a piece of text. For example, sentiment analysis may classify the sentiment of a piece of text as one or more of positive, negative, neutral, happy, sad, angry, or any other emotional tone. In some embodiments, sentiment analysis may allow for determining opinions, emotions, attitudes, and/or feelings expressed in textual content. In some embodiments, the one or more machine learning models may be trained to assign a sentiment score to each word in textual content and may calculate an overall sentiment score for the textual content to determine a sentiment of the textual content.

In some embodiments, the one or more machine learning models may be trained to analyze at least the first file and generate a response based on the analysis. For example, content may comprise a query from a user (e.g., "What is a patent?" 304 shown in FIG. 3) received through a graphical user interface, and the one or more machine learning models may be trained to generate a response to the query from the user (e.g., "A patent is . . . " 306 shown in FIG. 3) by analyzing the normalized query. In some embodiments, analyzing the first file may comprise performing context analysis.

In some embodiments, the one or more machine learning models may comprise one or more autoregressive models, wherein tokens may be generated one at a time with each new token being predicted by considering a context of all previously generated tokens as well as the query. For example, the one or more machine learning models may be trained to tokenize the query from the user into individual words or sub-words. Using the tokenized query, the one or more machine learning models may be trained to generate a probability distribution for a first token to append to generated text. Once the first token is appended to the generated text, resulting in updated text, the one or more machine learning models may be trained to predict a second token based on an updated context of the updated text. In some embodiments, the one or more machine learning models may be trained to repeat this process until a desired response length or stopping condition is reached. In some embodiments, the desired response length or stopping condition may be preset. For example, the desired response length or stopping condition may be determined by at least one of a user-specified length or a maximum token limit. In some embodiments, learning model 130 may dynamically determine the desired response length or stopping condition based on the context of the content.

In some embodiments, the one or more machine learning models may be trained to analyze at least one of the first file or learning model data to identify and output a set of context parameters associated with the first file or learning model data. For instance, the set of context parameters may comprise at least one of a location ("where"), a person ("who"), a time period or time of day ("when"), an event ("what"), or causal reasoning ("why") associated with the first file or learning model data. In some embodiments, the one or more machine learning models may be trained to analyze at least one of the first file or learning model data to identify a set of key elements within the first file or learning model data. For example, the one or more machine learning models may be trained to identify keywords and phrases within textual data by recognizing patterns and recurring terms. Additionally or alternatively, the one or more machine learning models may be configured to identify key visual elements within visual data by analyzing visual features (e.g., size, color, shape, position) within the visual data. For example, the one or more machine learning models may be trained to analyze at least one of the first file or learning model data to identify objects within the first file or learning model data. In some embodiments, the one or more machine learning models may be trained to understand a context of an image or video frame to determine whether one or more objects within the image or video frame should be considered key visual elements.

In some embodiments, when the first file or learning model data comprises multiple modalities, the one or more machine learning models may be trained to analyze each modality separately to extract modality-specific features. For example, for textual data, the one or more machine learning models may be trained to perform natural language processing techniques. For example, the one or more machine learning models may be trained to perform named entity recognition (NER). Additionally or alternatively, for visual data, the one or more machine learning models may be trained to perform computer vision techniques. Additionally or alternatively, for audio data, the one or more machine learning models may be trained to perform audio processing techniques. In some embodiments, the one or more machine learning models may be trained to combine the extracted modality-specific features using fusion techniques. Doing so may allow the one or more machine learning models to capture cross-modal relationships and understand how the different modalities contribute to the first file or learning model data.

In some embodiments, the one or more machine learning models may be trained to perform abstractive text summarization. In some embodiments, abstractive text summarization may comprise generating a summary of the content by generating new sentences that capture a main idea and/or one or more key points of textual content.

In some embodiments, the at least one processor may be configured to discard elements not identified as key elements. Doing so may allow the one or more machine learning models to focus on key elements and data aligning with the key elements and contextual understanding. In some embodiments, the one or more machine learning models may be trained to learn from patterns in training data, which may allow for identification of or more common themes, topics, or information important for generating metadata.

At step 208, the at least one processor may be configured to generate, using the one or more machine learning models, metadata from at least the first file. In some embodiments, the at least one processor may be configured to generate, using the one or more machine learning models, metadata from at least one of the first file or learning model data. Metadata may include at least one of one or more titles, subtitles, names, icons, thumbnails, categories, descriptions, keywords, objects, tags, summaries, captions, images, or any other descriptive information associated with the learning model data. In some embodiments, metadata may reflect a context associated with the content.

In some embodiments, generating metadata may be based on determining at least one of a main topic, purpose, or one or more key points of the first file or learning model data. For example, the one or more machine learning models may be trained to identify important and relevant aspects of the content such that unnecessary details may be removed prior to generating metadata. In some embodiments, the one or more machine learning models may be trained to generate metadata that is clear and concise. For example, token constraints may be implemented to prevent the one or more machine learning models from generating lengthy or large outputs. Doing so may prevent confusion or ambiguity and may help to accurately convey a context of the content. In some embodiments, the one or more machine learning models may be trained to generate metadata that avoids biases or stereotypes. In some embodiments, the one or more machine learning models may be trained to generate metadata that reflects a tone (e.g., formal, casual, professional, playful, etc.) of the first file. In some embodiments, the one or more machine learning models may be trained to generate metadata utilizing domain-specific elements (e.g., terminology specific to law, technology, healthcare, etc.). In some embodiments, the one or more machine learning models may be trained to generate metadata that does not utilize redundant words or phrases and is unique to the content. In some embodiments, the one or more machine learning models may be trained to identify an audience for the metadata to be output to. For example, the one or more machine learning models may be trained to identify the audience based on metadata received with the content, such as determined by data input engine 110 of FIG. 1 discussed above.

In some embodiments, the one or more machine learning models may be trained to prune through a plurality of generated metadata outputs until one or more metadata outputs meeting certain conditions is determined. For example, the one or more machine learning models may be trained to rank the plurality of metadata outputs based on quality and/or relevance to the content, and may select one or more metadata outputs associated with the highest ranks in quality and relevance.

In some embodiments, the at least one processor or the one or more machine learning models may be trained to modify the generated metadata. For example, modifying the generated metadata may include filtering the metadata and modifying a size of the metadata. In some embodiments, filtering the metadata may include removing any offensive, sensitive, or inappropriate information. Additionally or alternatively, the at least one processor may be configured to modify a size of the metadata based on one or more constraints, such as user interface constraints or design constraints. For example, the at least one processor may be configured to reduce a length of a chat name generated by the one or more machine learning models. Additionally or alternatively, the at least one processor may be configured to modify the generated metadata to improve a fluency of the metadata. In some embodiments, modifying the generated metadata may be performed prior to pruning through the plurality of metadata outputs. In some embodiments, modifying the generated metadata may be performed after selecting one or more metadata outputs of the plurality of metadata outputs.

At step 210, the at least one processor may be configured to generate a second file, the second file comprising the metadata. In some embodiments, generating the second file may comprise resizing the second file to comport with a predetermined size, the predetermined size being pre-established for a specific use selected from at least one of thumbnail, title, or abstract. In some embodiments, the at least one processor may be configured to modify the generated metadata in the second file by filtering the metadata and modifying a size of the metadata. In some embodiments, the modified metadata may comprise at least one of a title, subtitle, name, icon, thumbnail, category, summary, description, or image associated with the content.

At step 212, the at least one processor may be configured to display the generated metadata. For example, the at least one processor may cause the user device to display the generated metadata on the graphical user interface (e.g., 308 of FIG. 3 discussed below). In some embodiments, displaying the generated metadata comprises displaying the modified metadata on the graphical user interface. In some embodiments, displaying metadata may be performed by output engine 140 from FIG. 1.

In some embodiments, the at least one processor may be configured to perform at least one of prompting or finetuning of the one or more machine learning models. For example, generating the metadata may comprise at least one of prompting the large language model to generate the metadata based on the first file, or finetuning the large language model based on the first file to generate the metadata. Prompting may comprise inputting a sequence of prompts to the one or more machine learning models to guide the one or more machine learning models towards one or more desired responses. For example, the at least one processor may be configured to iteratively input a series of increasingly more specific prompts to trigger one or more specific outputs from the one or more machine learning models. Finetuning may comprise tuning the one or more machine learning models for one or more specific uses. For example, the at least one processor may be configured to further train the pre-trained one or more machine learning models with a specific dataset associated with a specific use. In some embodiments, the specific use may comprise at least one of a particular style, task, or domain. During finetuning, parameters of the one or more machine learning models may be adjusted based on the specific dataset in order to tailor the one or more machine learning models to the specific use. In some embodiments, at least one of prompting or finetuning may be performed by one or more users via one or more user devices.

In some embodiments, one or more steps of process 200 may be repeated. For example, one or more steps of process 200 may be repeated every time new content is received through a graphical user interface associated with the one or more machine learning models. In some embodiments, one or more steps of process 200 may be repeated in response to receiving an update request, wherein the update request may include a request to generate updated metadata. For example, the update request may include a request to generate updated metadata for the same content and/or new content. In some embodiments, one or more steps of process 200 may be repeated periodically (e.g., every few seconds, minutes, hourly, etc.). In some embodiments, one or more steps of process 200 may only be performed once for the same content.

FIG. 3 illustrates an exemplary user interface 300 for displaying metadata generated based on content, according to some embodiments of the present disclosure. User interface element 302 may comprise a text input field configured to obtain and/or receive first content from external users. For example, a user may input first content, such as a query "WHAT IS A PATENT?" into user interface element 302. In some embodiments, user interface element 302 may be configured to obtain and/or receive first content as discussed above with respect to data input engine 110 of FIG. 1. After first content is received (e.g., the user submits the query), the first content may be displayed in section 304 of interface 300 (e.g., "WHAT IS A PATENT?"). One or more machine learning models may be configured to receive the first content and may generate second content in response. For example, the query may be normalized and, based on the normalized query as well as a context of the normalized query, a large language model may be configured to generate a response to the query, such as the one shown in section 306 of interface 300 (e.g., "A PATENT IS A LEGAL RIGHT . . . "). Based on the first content and the second content, the one or more machine learning models may be configured to generate metadata. For example, based on the normalized query and response generated by the large language model, the large language model may further generate a title, such as the one shown in section 308 of interface 300 (e.g., "PATENT: LEGAL RIGHTS FOR . . . ").

An exemplary operating environment for implementing various aspects of this disclosure is illustrated in FIG. 4. As illustrated in FIG. 4, an exemplary operating environment 400 may include a computing device 402 (e.g., a general-purpose computing device) in the form of a computer. In some embodiments, computing device 402 may be associated with a user. Components of the computing device 402 may include, but are not limited to, various hardware components, such as one or more processors 406, data storage 408, a system memory 404, other hardware 410, and a system bus (not shown) that couples (e.g., communicably couples, physically couples, and/or electrically couples) various system components such that the components may transmit data to and from one another. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

With further reference to FIG. 4, an operating environment 400 for an exemplary embodiment includes at least one computing device 402. The computing device 402 may be a uniprocessor or multiprocessor computing device. An operating environment 400 may include one or more computing devices (e.g., multiple computing devices 402) in a given computer system, which may be clustered, part of a local area network (LAN), part of a wide area network (WAN), client-server networked, peer-to-peer networked within a cloud, or otherwise communicably linked. A computer system may include an individual machine or a group of cooperating machines. A given computing device 402 may be configured for end-users, e.g., with applications, for administrators, as a server, as a distributed processing node, as a special-purpose processing device, or otherwise configured to train machine learning models and/or use machine learning models. In some embodiments, multiple computing devices 402 (e.g., a network of GPUs) may be configured to train a machine learning model.

One or more users may interact with the computer system comprising one or more computing devices 402 by using a display, keyboard, mouse, microphone, touchpad, camera, sensor (e.g., touch sensor) and other input/output devices 418, via typed text, touch, voice, movement, computer vision, gestures, and/or other forms of input/output. An input/output device 418 may be removable (e.g., a connectable mouse or keyboard) or may be an integral part of the computing device 402 (e.g., a touchscreen, a built-in microphone). A user interface 412 may support interaction between an embodiment and one or more users. A user interface 412 may include one or more of a command line interface, a graphical user interface (GUI), natural user interface (NUI), voice command interface, and/or other user interface (UI) presentations, which may be presented as distinct options or may be integrated. A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other NUI may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

One or more application programming interface (API) calls may be made between input/output devices 418 and computing device 402, based on input received from at user interface 412 and/or from network(s) 416. As used throughout, "based on" may refer to being established or founded upon a use of, changed by, influenced by, caused by, dependent upon, or otherwise derived from. In some embodiments, an API call may be configured for a particular API, and may be interpreted and/or translated to an API call configured for a different API. As used herein, an API may refer to a defined (e.g., according to an API specification) interface or connection between computers or between computer programs.

System administrators, network administrators, software developers, engineers, and end-users are each a particular type of user. Automated agents, scripts, playback software, and the like acting on behalf of one or more people may also constitute a user. Storage devices and/or networking devices may be considered peripheral equipment in some embodiments and part of a system comprising one or more computing devices 402 in other embodiments, depending on their detachability from the processor(s) 406. Other computerized devices and/or systems not shown in FIG. 4 may interact in technological ways with computing device 402 or with another system using one or more connections to a network 416 via a network interface 414, which may include network interface equipment, such as a physical network interface controller (NIC) or a virtual network interface (VIF).

Computing device 402 includes at least one logical processor 406. The at least one logical processor 406 may include circuitry and transistors configured to execute instructions from memory (e.g., memory 404). For example, the at least one logical processor 406 may include one or more central processing units (CPUs), arithmetic logic units (ALUs), Floating Point Units (FPUs), and/or Graphics Processing Units (GPUs). The computing device 402, like other suitable devices, also includes one or more computer-readable storage media, which may include, but are not limited to, memory 404 and data storage 408. In some embodiments, memory 404 and data storage 408 may be part a single memory component. The one or more computer-readable storage media may be of different physical types. The media may be volatile memory, non-volatile memory, fixed in place media, removable media, magnetic media, optical media, solid-state media, and/or of other types of physical durable storage media (as opposed to merely a propagated signal). In particular, a configured medium 420 such as a portable (i.e., external) hard drive, compact disc (CD), Digital Versatile Disc (DVD), memory stick, or other removable non-volatile memory medium may become functionally a technological part of the computer system when inserted or otherwise installed with respect to one or more computing devices 402, making its content accessible for interaction with and use by processor(s) 406. The removable configured medium 420 is an example of a computer-readable storage medium. Some other examples of computer-readable storage media include built-in random access memory (RAM), read-only memory (ROM), hard disks, and other memory storage devices which are not readily removable by users (e.g., memory 404).

The configured medium 420 may be configured with instructions (e.g., binary instructions) that are executable by a processor 406; "executable" is used in a broad sense herein to include machine code, interpretable code, bytecode, compiled code, and/or any other code that is configured to run on a machine, including a physical machine or a virtualized computing instance (e.g., a virtual machine or a container). The configured medium 420 may also be configured with data which is created by, modified by, referenced by, and/or otherwise used for technical effect by execution of the instructions. The instructions and the data may configure the memory or other storage medium in which they reside; such that when that memory or other computer-readable storage medium is a functional part of a given computing device, the instructions and data may also configure that computing device.

Although an embodiment may be described as being implemented as software instructions executed by one or more processors in a computing device (e.g., general-purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include other hardware logic components 410 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processor(s) 406, memory 404, data storage 408, and screens/displays, an operating environment 400 may also include other hardware 410, such as batteries, buses, power supplies, wired and wireless network interface cards, for instance. The nouns "screen" and "display" are used interchangeably herein. A display may include one or more touch screens, screens responsive to input from a pen or tablet, or screens which operate solely for output. In some embodiment, other input/output devices 418 such as human user input/output devices (screen, keyboard, mouse, tablet, microphone, speaker, motion sensor, etc.) will be present in operable communication with one or more processors 406 and memory.

In some embodiments, the system includes multiple computing devices 402 connected by network(s) 416. Networking interface equipment can provide access to network(s) 416, using components (which may be part of a network interface 414) such as a packet-switched network interface card, a wireless transceiver, or a telephone network interface, for example, which may be present in a given computer system. However, an embodiment may also communicate technical data and/or technical instructions through direct memory access, removable non-volatile media, or other information storage-retrieval and/or transmission approaches.

The computing device 402 may operate in a networked or cloud-computing environment using logical connections to one or more remote devices (e.g., using network(s) 416), such as a remote computer (e.g., another computing device 402). The remote computer may include one or more of a personal computer, a server, a router, a network PC, or a peer device or other common network node, and may include any or all of the elements described above relative to the computer. The logical connections may include one or more LANs, WANS, and/or the Internet.

When used in a networked or cloud-computing environment, computing device 402 may be connected to a public or private network through a network interface or adapter. In some embodiments, a modem or other communication connection device may be used for establishing communications over the network. The modem, which may be internal or external, may be connected to the system bus via a network interface or other appropriate mechanism. A wireless networking component such as one comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Computing device 402 typically may include any of a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, electrically erasable programmable read-only memory (EEPROM), flash memory or other memory technology, CD-ROM, DVD or other optical disk storage, magnetic cassettes, magnetic tape, magnetic disk storage or other magnetic storage devices, or any other medium which can be used to store the desired information (e.g., program modules, data for a machine learning model, and/or a machine learning model itself) and which can be accessed by the computer. Communication media may embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of the any of the above may also be included within the scope of computer-readable media. Computer-readable media may be embodied as a computer program product, such as software (e.g., including program modules) stored on non-transitory computer-readable storage media.

The data storage 408 or system memory includes computer storage media in the form of volatile and/or nonvolatile memory such as ROM and RAM. A basic input/output system (BIOS), containing the basic routines that help to transfer information between elements within computer, such as during start-up, may be stored in ROM. RAM may contain data and/or program modules that are immediately accessible to and/or presently being operated on by processing unit. By way of example, and not limitation, data storage holds an operating system, application programs, and other program modules and program data.

Data storage 408 may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

Exemplary disclosed embodiments include systems, methods, and computer-readable media for the generation of text and/or code embeddings. For example, in some embodiments, and as illustrated in FIG. 4, an operating environment 400 may include at least one computing device 402, the at least one computing device 402 including at least one processor 406, at least one memory 404, at least one data storage 408, and/or any other component discussed above with respect to FIG. 4.

FIG. 5 is a block diagram illustrating an exemplary machine learning platform for implementing various aspects of this disclosure, according to some embodiments of the present disclosure.

System 500 may include data input engine 510 that can further include data retrieval engine 504 and data transform engine 506. Data retrieval engine 504 may be configured to access, access, interpret, request, or receive data, which may be adjusted, reformatted, or changed (e.g., to be interpretable by other engine, such as data input engine 510). For example, data retrieval engine 504 may request data from a remote source using an API. Data input engine 510 may be configured to access, interpret, request, format, re-format, or receive input data from data source(s) 502. For example, data input engine 510 may be configured to use data transform engine 506 to execute a re-configuration or other change to data, such as a data dimension reduction. Data source(s) 502 may exist at one or more memories 404 and/or data storages 408. In some embodiments, data source(s) 502 may be associated with a single entity (e.g., organization) or with multiple entities. Data source(s) 502 may include one or more of training data 502a (e.g., input data to feed a machine learning model as part of one or more training processes), validation data 502b (e.g., data against which at least one processor may compare model output with, such as to determine model output quality), and/or reference data 502c. In some embodiments, data input engine 510 can be implemented using at least one computing device (e.g., computing device 402). For example, data from data sources 502 can be obtained through one or more I/O devices and/or network interfaces. Further, the data may be stored (e.g., during execution of one or more operations) in a suitable storage or system memory. Data input engine 510 may also be configured to interact with data storage 408, which may be implemented on a computing device that stores data in storage or system memory. System 500 may include featurization engine 520. Featurization engine 520 may include feature annotating & labeling engine 512 (e.g., configured to annotate or label features from a model or data, which may be extracted by feature extraction engine 514), feature extraction engine 514 (e.g., configured to extract one or more features from a model or data), and/or feature scaling and selection engine 516. Feature scaling and selection engine 516 may be configured to determine, select, limit, constrain, concatenate, or define features (e.g., AI features) for use with AI models. System 500 may also include machine learning (ML) modeling engine 530, which may be configured to execute one or more operations on a machine learning model (e.g., model training, model re-configuration, model validation, model testing), such as those described in the processes described herein. For example ML modeling engine 530 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 502a) through a machine learning model process (e.g., a training process). In some embodiments, different epochs may have different degrees of supervision (e.g., supervised, semi-supervised, or unsupervised). Data into to a model to train the model may include input data (e.g., as described above) and/or data previously output from a model (e.g., forming recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, trillions, or even billions of model parameters. ML modeling engine 530 may include model selector engine 532 (e.g., configured to select a model from among a plurality of models, such as based on input data), parameter selector engine 534 (e.g., configured to add, remove, and/or change one or more parameters of a model), and/or model generation engine 536 (e.g., configured to generate one or more machine learning models, such as according to model input data, model output data, comparison data, and/or validation data). Similar to data input engine 510, featurization engine 520 can be implemented on a computing device. In some embodiments, model selector engine 532 may be configured to receive input and/or transmit output to ML algorithms database 590 (e.g., a data storage 408). Similarly, featurization engine 520 can utilize storage or system memory for storing data and can utilize one or more I/O devices or network interfaces for transmitting or receiving data. ML algorithms database 590 (or other data storage 408) may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a Generative Pre-trained Transformer (GPT) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

System 500 can further include predictive output generation engine 540, output validation engine 550 (e.g., configured to apply validation data to machine learning model output), feedback engine 570 (e.g., configured to apply feedback from a user and/or machine to a model), and model refinement engine 560 (e.g., configured to update or re-configure a model). In some embodiments, feedback engine 570 may receive input and/or transmit output (e.g., output from a trained, partially trained, or untrained model) to outcome metrics database 580. Outcome metrics database 580 may be configured to store output from one or more models, and may also be configured to associate output with one or more models. In some embodiments, outcome metrics database 580, or other device (e.g., model refinement engine 560 or feedback engine 570) may be configured to correlate output, detect trends in output data, and/or infer a change to input or model parameters to cause a particular model output or type of model output. In some embodiments, model refinement engine 560 may receive output from predictive output generation engine 540 or output validation engine 550. In some embodiments, model refinement engine 560 may transmit the received output to featurization engine 520 or ML modeling engine 530 in one or more iterative cycles.

Any or each engine of system 500 may be a module (e.g., a program module), which may be a packaged functional hardware unit designed for use with other components (e.g., the at least one processor and a memory component) or a part of a program that performs a particular function (e.g., of related functions). Any or each of these modules may be implemented using a computing device. In some embodiments, the functionality of system 500 may be split across multiple computing devices to allow for distributed processing of the data, which may improve output speed and reduce computational load on individual devices. In some embodiments, system 500 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 500 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

Computer program code for carrying out operations, for example, embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for generating metadata from content using a large language model, the system comprising:
   at least one memory storing instructions; and
   at least one processor comprising a plurality of distributed processors configured to execute the instructions to perform operations, wherein the system is configured to perform the operations using load-balancing to maintain stable resource load among the plurality of processors, the operations comprising:
      receiving the content through a graphical user interface associated with the large language model;
      generating a first file by tokenizing the content into an input format for the large language model and merging the tokenized content with a content instruction;
      inputting the first file into the large language model;
      generating, using the large language model, a plurality of metadata by determining a main topic from at least the first file, the plurality of metadata reflecting a context associated with the content, wherein the large language model is trained to determine the main topic by identifying a first detail from the first file and removing a second detail from the first file prior to generating the plurality of metadata;
      ranking the plurality of metadata according to a relevance of each generated metadata to the first file determined based on a sentiment analysis performed by the large language model, wherein the sentiment analysis performed by the large language model comprises classifying the first file and the generated metadata in one or more emotional attitudes;
      determining, based on the ranking, one metadata from the plurality of metadata for display;
      generating a second file, the second file comprising the determined one metadata, wherein generating the second file comprises implementing a token constraint and resizing the determined one metadata to comport with a predetermined size, the predetermined size being pre-established for a specific use selected from at least one of thumbnail, title, or abstract; and
      displaying the generated second file comprising the determined one metadata on the graphical user interface, wherein displaying the generated second file includes only displaying the determined one metadata of the plurality of metadata.

2. The system of claim 1, wherein the content comprises at least one of a text query from a user or a text response generated by the large language model.

3. The system of claim 1, wherein the content comprises at least one of a text document or an image file, and wherein the plurality of metadata comprises a plurality of titles.

4. The system of claim 1, wherein the at least one processor is further configured to execute the instructions to perform:
   generating structured content associated with the received content; and
   incorporating the structured content into the content for the input into the large language model.

5. The system of claim 1, wherein the large language model comprises a multi-modal large language model.

6. The system of claim 5, wherein the at least one processor is further configured to execute the instructions to perform at least one of:
   prompting the large language model, or
   fine tuning the large language model.

7. The system of claim 1, wherein
   the content comprises a plurality of words, and
   the large language model is trained to generate contextual embeddings for each word of the plurality of words.

8. The system of claim 1, wherein the large language model is configured to perform abstractive text summarization.

9. The system of claim 1, wherein the at least one processor is further configured to execute the instructions to perform:
   modifying the selected one metadata in the second file by filtering the selected one metadata; and
   displaying the generated second file comprises displaying the modified metadata on the graphical user interface.

10. A method for generating metadata from content using a large language model, comprising:
    receiving, via at least one processor comprising a plurality of distributed processors configured to use load-balancing to maintain stable resource load among the plurality of processors, the content through a graphical user interface associated with the large language model;

generating, via the at least one processor, a first file by tokenizing the content into an input format for the large language model and merging the tokenized content with a content instruction;

inputting, via the at least one processor, the first file into the large language model;

generating, via the at least one processor using the large language model, a plurality of metadata by determining a main topic from at least the first file, the plurality of metadata reflecting a context associated with the content, wherein the large language model is trained to determine the main topic by identifying a first detail from the first file and removing a second detail from the first file prior to generating the plurality of metadata;

ranking, via the at least one processor, the plurality of metadata according to a relevance of each generated metadata to the first file determined based on a sentiment analysis performed by the large language model, wherein the sentiment analysis performed by the large language model comprises classifying the first file and the generated metadata in one or more emotional attitudes;

determining, via the at least one processor based on the ranking, one metadata from the plurality of metadata for display;

generating, via the at least one processor, a second file, the second file comprising the determined one metadata, wherein generating the second file comprises implementing a token constraint and resizing the determined one metadata to comport with a predetermined size, the predetermined size being pre-established for a specific use selected from at least one of thumbnail, title, or abstract; and displaying, via the at least one processor, the generated second file comprising the determined one metadata on the graphical user interface, wherein displaying the generated second file includes only displaying the determined one metadata of the plurality of metadata.

11. The method of claim 10, wherein the content comprises a text query from a user.

12. The method of claim 10, wherein the content comprises at least one of a text document or an image file, and wherein the plurality of metadata comprises a plurality of titles.

13. The method of claim 10, further comprising:
generating structured content associated with the received content; and
incorporating the structured content into the content for the input into the large language model.

14. The method of claim 10, further comprising:
performing at least one of:
prompting the large language model, or
fine tuning the large language model.

15. The method of claim 10, wherein
the content comprises a plurality of words, and
the large language model is trained to generate contextual embeddings for each word of the plurality of words.

16. The method of claim 10, further comprising:
modifying the selected one metadata in the second file by filtering the selected one metadata, wherein the modified metadata comprises at least one of a title, subtitle, name, icon, thumbnail, category, summary, description, or image associated with the content; and
displaying the generated second file comprises displaying the modified metadata on the graphical user interface.

17. The system of claim 1, wherein the relevance of each generated metadata to the first file is further based on a sentiment score calculated by the large language model.

18. The method of claim 10, wherein the relevance of each generated metadata to the first file is further based on a sentiment score calculated by the large language model.

19. The system of claim 1, wherein:
the at least one processor is further configured to execute the instructions to generate, by the large language model based on the input first file, a response; and
generating the plurality of metadata is based on both the first file and the response generated by the large language model.

20. The system of claim 19, wherein the response generated by the large language model is displayed on a same page as the received content and the determined one metadata.

* * * * *